United States Patent
van Vuuren et al.

(10) Patent No.: US 8,024,922 B2
(45) Date of Patent: Sep. 27, 2011

(54) REDUCTANT DELIVERY UNIT FOR SELECTIVE CATALYTIC REDUCTION

(75) Inventors: Willem Nicolaas van Vuuren, Yorktown, VA (US); Stephen Bugos, Poquoson, VA (US); William Imoehl, Williamsburg, VA (US); Michael Hornby, Williamsburg, VA (US); Ray Wildeson, Yorktown, VA (US); Olaf Graupner, Kofering (DE); David Cole, Hampton, VA (US)

(73) Assignee: Continental Automotive Systems US, Inc., Auburn Hills ( * ) Notice: Subject to any disclaimer, the term of this patent is extended or adjusted under 35 U.S.C. 154(b) by 679 days.

(21) Appl. No.: 12/078,252

(22) Filed: Mar. 28, 2008

(65) Prior Publication Data

US 2008/0236147 A1    Oct. 2, 2008

Related U.S. Application Data

(60) Provisional application No. 60/909,017, filed on Mar. 30, 2007, provisional application No. 60/909,086, filed on Mar. 30, 2007, provisional application No. 60/909,082, filed on Mar. 30, 2007, provisional application No. 60/917,093, filed on May 10, 2007, provisional application No. 60/917,181, filed on May 10, 2007.

(51) Int. Cl.
    *F01N 3/00* (2006.01)
(52) U.S. Cl. .......... 60/286; 60/274; 60/295; 60/301; 60/303; 137/15.17; 137/341; 137/507; 137/850
(58) Field of Classification Search .......... 60/272, 60/274, 286, 295, 301, 303; 137/15.17, 15.18, 137/340, 341, 507, 850
See application file for complete search history.

(56) References Cited

U.S. PATENT DOCUMENTS

| | | | | |
|---|---|---|---|---|
| 5,771,689 A * | 6/1998 | Bareis et al. | ..... | 60/286 |
| 6,279,603 B1 * | 8/2001 | Czarnik et al. | ..... | 137/339 |
| 6,814,303 B2 * | 11/2004 | Edgar et al. | ..... | 239/128 |
| 6,996,976 B2 * | 2/2006 | Rumminger et al. | ..... | 60/295 |
| 7,603,849 B2 * | 10/2009 | Hanitzsch et al. | ..... | 60/286 |
| 7,614,213 B2 * | 11/2009 | Hirata et al. | ..... | 60/286 |
| 7,707,825 B2 * | 5/2010 | Dingle et al. | ..... | 60/286 |
| 2006/0101810 A1 * | 5/2006 | Angelo et al. | ..... | 60/286 |

FOREIGN PATENT DOCUMENTS

| | | |
|---|---|---|
| DE | 19919426 C1 | 3/2000 |
| DE | 102005003583 A1 | 7/2006 |
| DE | 102005037150 A1 | 2/2007 |
| EP | 1582712 A | 10/2005 |
| EP | 1662108 A | 5/2006 |
| JP | 09096212 A | 4/1997 |

(Continued)

*Primary Examiner* — Binh Q Tran

(57) ABSTRACT

A reductant delivery unit (10) is provided for selective catalytic reduction (SCR) after-treatment for vehicles. The unit includes a solenoid fluid injector (10) constructed and arranged to be associated with an exhaust gas flow path (14) upstream of a SCR catalytic converter (17). The fluid injector has a fluid inlet (13) and a fluid outlet (15) with the fluid inlet being constructed and arranged to receive a source of urea solution and the fluid outlet being constructed and arranged to communicate directly with the exhaust flow path so as to control injection of urea solution into the exhaust gas flow path. An interface (24) is constructed and arranged to couple the fluid injector to the gas flow path. The interface defines a thermal barrier constructed and arranged to decoupled a body of the injector from exposure to heat in the exhaust gas flow path.

33 Claims, 4 Drawing Sheets

FOREIGN PATENT DOCUMENTS

| | | |
|---|---|---|
| WO | WO 00/18491 A | 4/2000 |
| WO | WO 00/75643 A | 12/2000 |
| WO | WO 03/017177 A | 3/2003 |
| WO | WO 03/027454 A | 4/2003 |
| WO | WO 03/050416 A | 6/2003 |
| WO | WO 2005/025725 A | 2/2005 |

* cited by examiner

REDUCTANT DELIVERY UNIT FOR SELECTIVE CATALYTIC REDUCTION

This application claims the benefit for priority purposes of the earlier filing date of U.S. Provisional Application No. 60/909,017, filed on Mar. 30, 2007, No. 60/909,086, filed on Mar. 30, 2007, No. 60/909,082, filed on Mar. 30, 2007, No. 60/917,093, filed on May 10, 2007 and No. 60/917,181, filed on May 10, 2007, and each of these applications is hereby incorporated by reference into this specification.

FIELD OF THE INVENTION

The invention relates to a reductant delivery unit (RDU) that supplies reductant to an engine exhaust system.

BACKGROUND OF THE INVENTION

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution (CO $(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

The delivery of the AUS-32 solution to the exhaust involves precise metering of the fluid and proper preparation of the fluid to facilitate the later mixing of the ammonia in the exhaust stream.

Robert Bosch and Purem each have SCR systems in limited volume production for the heavy-duty diesel engine sector. The urea solution delivery function in these systems involves a physical separation of the critical metering and spray preparation functions.

In the case of the Purem system, the metering control is carried out by a Siemens Deka IV injector mounted in a control block. The metered fluid is transported via a tube to the exhaust. After the metering valve, the fluid is also exposed to compressed air to aid with atomization which will ensure subsequent good mixing with the exhaust gas. The pressurized mixture is then injected into the exhaust.

The Bosch production system also comprises an air-assisted solution with separation of the metering and spray preparation functions. Bosch has also disclosed a system concept that does not use air.

Since air compression is not expected to be available on many future applications of the SCR technology, there is a need to have delivery of the AUS-32 without air-assistance while using a solenoid injector.

There is also a need to provide a thermal barrier between the injector of an RDU and an exhaust pipe that defines a portion of the exhaust gas flow path.

The freezing point of AdBlue is −11 C. An alternative reductant carrier under development, known commercially as Denoxium, has a freezing point of −30 C. In the case of both fluids, it is expected that system freezing will occur in cold climates. A problem then arises of being able to meter fluid sufficiently quickly to the exhaust system upon startup of the engine, especially if fluid has been resident in the RDU and has frozen. In conventional systems, fluid is evacuated from the system and the RDU at engine shutdown to avoid localized freezing of the fluid in the injection unit. In certain instances, complete evacuation of the RDU may require ingress of exhaust gas through an injecting unit. This procedure could cause damage to the injecting unit with the introduction of contaminants.

Thus, there is also a need to prevent freezing of urea solution in an RDU and thereby eliminate the need to evacuate the fluid from the system.

In addition, AdBlue has a boiling point of 104 C at atmospheric pressure. Under certain system configurations, for example when the reductant injection location is downstream of a diesel particulate filter undergoing a regeneration event, and fluid flow through the injector has been stopped, the fluid temperatures in the RDU can exceed this boiling temperature. If the fluid boils under these conditions and heating continues, thermolysis of the urea solution can occur leading subsequently to the creation of deposit forming compounds such as biuret and melamines. These deposits can lead to injector malfunction and should be avoided.

Thus, there is a need to ensure that boiling is minimized inside the fluid supply system and the RDU during periods of extreme heating, specifically during a diesel particulate filter regeneration event.

SUMMARY OF THE INVENTION

An object of the invention is to fulfill the needs referred to above. In accordance with the principles of the present invention, this objective is obtained by providing a reductant delivery unit for selective catalytic reduction (SCR) after-treatment for vehicles. The unit includes a solenoid fluid injector constructed and arranged to be associated with an exhaust gas flow path upstream of a SCR catalytic converter. The fluid injector has a fluid inlet and a fluid outlet with the fluid inlet being constructed and arranged to receive a source of urea solution and the fluid outlet being constructed and arranged to communicate directly with the exhaust flow path so as to control injection of urea solution into the exhaust gas flow path. An interface is constructed and arranged to couple the fluid injector to the gas flow path. The interface defines a thermal barrier constructed and arranged to decouple the body of the fluid injector from exposure to heat in the exhaust gas flow path.

In accordance with an aspect of a disclosed embodiment, the interface includes a gasket constructed and arranged to seal exhaust gas in an exhaust pipe defining a portion of the exhaust gas flow path, and a guide constructed and arranged to support an end of the injector with respect to a boss of the exhaust pipe. The gasket and guide define the thermal barrier.

In accordance with another aspect of a disclosed embodiment, the interface includes a base welded to the body of the injector and a generally cylindrical member coupled to and extending from the base. The cylindrical member supports a portion of the injector and the base is constructed and arranged to be coupled with a member that defines a portion of the exhaust gas flow path.

In accordance with another aspect of a disclosed embodiment, the interface includes an annulus welded to the body of injector and a plate coupled with the annulus. The plate is constructed and arranged to be coupled to an exhaust pipe defining a portion of the gas flow path.

In accordance with yet another aspect of a disclosed embodiment, a method provides heating of urea solution in a reductant delivery system for selective catalytic reduction (SCR) after-treatment for vehicles. The system includes a fluid injector, having a coil and armature, mounted with respect to an exhaust gas flow path so as to inject urea solution directly into the exhaust gas flow path, and a controller operatively associated with the fluid injector to control operation of the fluid injector. The method determines whether urea solution has frozen within the fluid injector. A command is issued, via the controller, to the fluid injector to actuate the coil and thereby deliver electrically generated heat to the fluid injector to melt the urea solution.

In accordance with another aspect of a disclosed embodiment, a method prevents boiling of urea solution in a reductant delivery system for selective catalytic reduction (SCR) after-treatment for vehicles. The system includes a fluid injector mounted with respect to an exhaust gas flow path so as to inject urea solution directly into the exhaust gas flow path, a controller operatively associated with the fluid injector to control operation of the fluid injector, and a pump, operatively associated with the controller, for delivering urea solution to the fluid injector. The method delivers urea solution to the fluid injector via the pump. It is determined whether a diesel particulate regeneration event is occurring in the system. If the event is occurring, delivery of the urea solution to the fluid injector is ceased and the pump is controlled to increase pressure of the urea solution in the system to prevent boiling of the urea solution.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
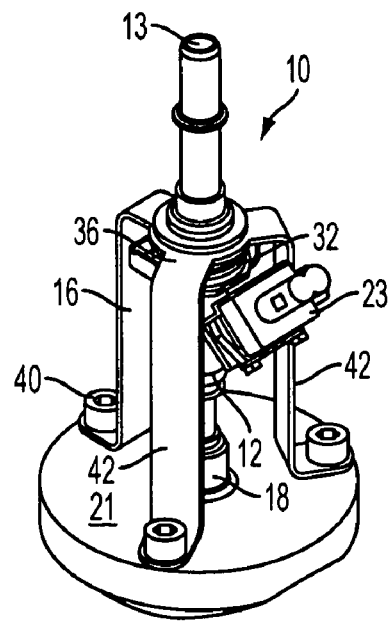
FIG. 1 is a view of an RDU provided in accordance with an embodiment of the present invention.

With reference to FIG. 1, a reductant delivery unit (RDU) for the delivery of AUS-32 to the engine exhaust is shown, generally indicated at 10, in accordance with an embodiment of the invention. The RDU 10 is used in SCR exhaust after-treatment systems on vehicles.

Figure 2:
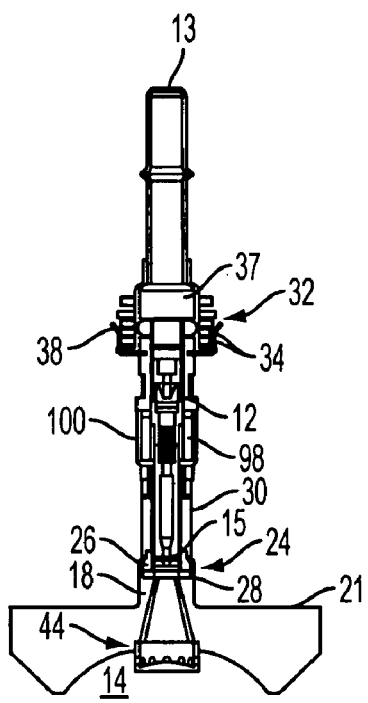
FIG. 2 is a side sectional view of the RDU of FIG. 1, shown without a mounting bracket.
Figure 3:
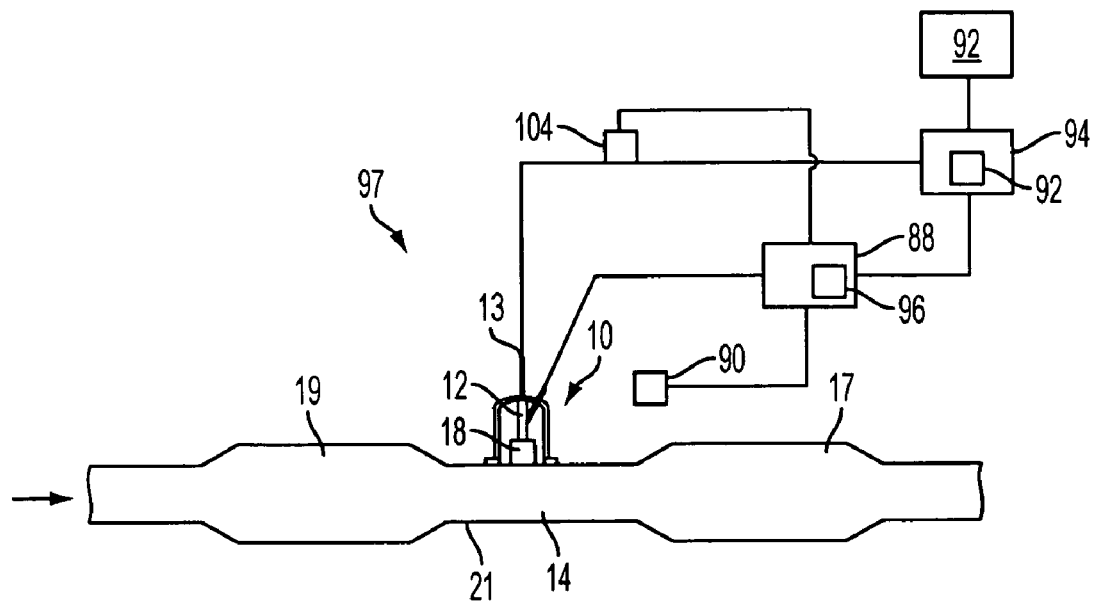
FIG. 3 is a schematic view of the RDU of FIG. 1 shown coupled to an exhaust flow path of a vehicle.

A feature of the RDU 10 is incorporation of the fluid metering and fluid preparation functions in the same unit. In order to accomplish this, the unit must be "close-coupled" to the exhaust, which implies exposure to a more hostile environment, particularly of the metering function which previously had been held outside of this environment remote from the exhaust system. The metering function is performed by a specially adapted and packaged solenoid fluid injector 12. The injector 12 also provides the spray preparation of the fluid in the exhaust path 14 (FIGS. 2 and 3) that is upstream of an SCR catalytic converter 17 (FIG. 3). More particularly, the injector 12 is mounted in the exhaust path 14 preferably between an oxygen catalytic converter 19 and the SCR catalytic converter 17. An advantage of using the fluid injector 12 is a reduction in cost afforded by using a high volume automotive component.

The fluid injector 12 is preferably a gasoline, electrically operated, solenoid fluid injector such as the type disclosed in U.S. Pat. No. 6,685,112, the content of which is hereby incorporated by reference into this specification. Thus, the injector 12 has a coil 98 and an armature 100 (FIG. 2). The injector 12 also has a fluid inlet 13 and a fuel outlet 15. The inlet 13 receives a source of urea solution or AUS-32 via a tank 92 and supply module 94. The fluid outlet 15 communicates with the exhaust flow path 14 so the solution can be injected directly into the exhaust flow path. In the embodiment, a flow diverter, generally indicated at 44 in FIG. 2, is connected with the outlet 15 for diverting fluid as it is injected into the exhaust flow path 14, as will be explained more fully below. Power is provided to the injector 12 at electrical connector 23. The injector 12 controls the flow rate of AUS-32 into the exhaust flow path 14 and also shuts-off the flow. A T-connection (not shown) can be provided at the inlet 13 if recirculation flow is desired. The RDU 10 includes a hold down bracket 16 that mounts the RDU 10 to a mounting boss 18 welded to the engine exhaust pipe 21.

In order to ensure compatibility of the fluid injector 12 with the exhaust system environment, a special interface, generally indicated at 24 in FIG. 2, is provided to reduce the exposure to high temperatures. The interface 24 includes an injector guide 26, preferably of polytetrafluoroethylene (PTFE), supporting an end of the injector 12 and an exhaust gasket 28 for exhaust gas sealing. The guide 26 is received in a portion of the boss 18. The interface 24 provides four principal functions: injector support, injector guide, exhaust gas sealing, and provision of a thermal barrier to prevent heat transfer to the injector 12. The prime function of the interface 24 is the thermal decoupling of a body 30 of the injector 12 from the exhaust temperatures.

In order for the installation of the injector 12 to take place without excessive compression forces on the injector, a stack-up compensating structure, generally indicated at 32, is provided to compensate for the stack-up of tolerances that may occur. This structure 32 employs compliant members, such as a series of wave washers 34 (FIG. 2). However, the structure 32 can include a coil spring, or other similar member that introduces compliance between the injector 12 and the hold down bracket 16. Thus, as shown in FIG. 1, a main body 36 of the bracket 16 engages the structure 32 thereby providing compliance between the injector 12 and bracket 16.

When the injector 12 is installed and reaches its seated position on the thermal barrier (gasket 28 and guide 26), the compliant members 34 will flex with a pre-determined rate of force versus displacement to limit the overall compression on the injector 12 itself. The compliant members 34 also ensure a minimum compression to prevent unseating of the injector 12 from the thermal barrier 26, 28 due to positive exhaust gas pressures.

With reference to FIG. 2, in addition, the injector 12 may be held to an injector cup 37 by a clip 38 for shipping purposes. In the embodiment, the clip 38 also provides the rigid connection between the injector 12 and the injector cup 37 which is receiving the hold down force from the mounting bracket 16. An alternative embodiment, with the compliant members 34 inside the injector cup 37 and riding on the top face of the injector 12, also includes a linking clip between the injector and the injector cup, but only for purposes of retention during shipping.

The mounting structure of the embodiment of FIG. 1 is shown as three bolts 40 evenly spaced radially at 120 degrees. The bolts 40 hold down three legs 42, extending from the main body 36 of the bracket 16, onto the mounting exhaust pipe 21. An alternative mounting means (not shown) employs a C-shaped mounting clamp that engages the legs 42 of the mounting bracket 16 and a lip formed in the exhaust pipe 21. A single screw can close the clamp (forming a tightening circle from a top view as the screw is tightened down).

As noted above, the RDU 10 can also include the flow diverter 44 coupled with the outlet 15 of the fluid injector 12 to divert the reductant that is injected into the flow path 14. SCR systems strive to avoid impingement of the injected fluid onto exhaust wall surfaces. Under certain conditions, this impingement can result in the formation of undesirable deposits as the urea solution adheres to a cold surface. The flow diverter 44 interferes with the spray's penetration into the exhaust system, preventing impingement on exhaust surfaces. Through passages in the diverter 44 permit good scavenging of the fluid by exhaust gas, limiting any deposit formation to the diverter surfaces themselves. Experience has shown that as the exhaust temperature rises, the surfaces will be cleaned of these deposits. Therefore, this embodiment minimizes the total area of potential deposit formation, and improves mixing with the exhaust gas.

Figure 4:
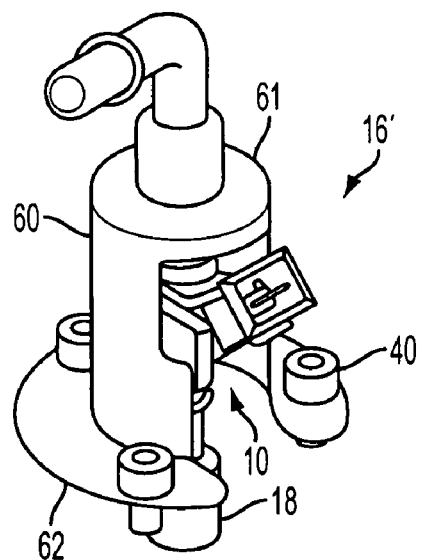
FIG. 4 is a view of the RDU having a bracket defining a heat shield provided in accordance with the principles of an embodiment of the invention.

In certain cases, the location of the RDU 10 can expose the unit to high ambient temperatures (as distinguished from high exhaust system gas temperatures). Thus, with reference to FIG. 4, the bracket 16' is configured simply as a generally bell-shaped unit, defining a heat shield 60 that provides protection to the RDU 10 from high ambient temperatures. A bell end 61 engages the injector 12 and a lip 62, opposite the bell end 61, serves as a carrier for the mounting bolts 40, or the engagement surface for the C-clamp mounting means mentioned above. Thus, the lip 62 is secured to the exhaust pipe 21 (not shown in FIG. 4).

The heat shield 60 is easily assembled, shipped, and installed as a unit and can provide structural unity between the exhaust system and the upper portion of the unit 10. This latter function can minimize differential vibration modes between the fluid supply end and the injection end of the unit 10, which may be important for configurations where the fluid supply has an inlet and an outlet (return fluid systems).

Figure 5:
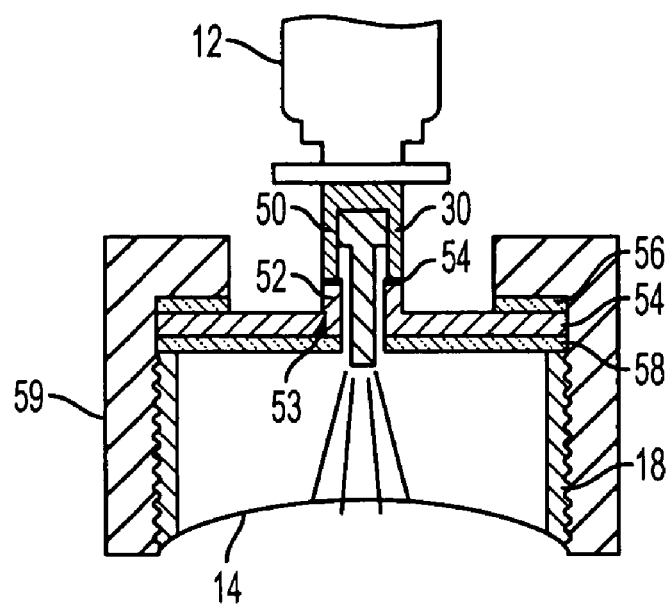
FIG. 5 is a sectional view of an interface, provided in accordance with another embodiment of the invention, for thermally decoupling the injector from a boss of the exhaust path.

With reference to FIG. 5, another embodiment of thermally decoupling the injector 12 from heat of the exhaust gas path 14 is shown. In the embodiment, a modification is made to the valve body 30 of the injector 12, which extends below the injector seat 50 sufficiently to allow for welding of an annulus 52 to it. The weld is shown at 54. The annulus 52 can be on the valve body internal diameter (as shown), or on the outer diameter. It is important for this weld location to be below the injector valve seat 50. Welding to the injector valve body 30 above the seat 50 could lead to a deformed valve body as a result of material shrinkage from welding, and hence an unwanted change in the injector performance as needle lifts are changed, and needle orientations (parallelism of the impact faces) are potentially changed as well.

With the ability to weld to the lower valve body 30 comes the ability to provide surfaces that can provide supports for mounting features that allow for compact and flexible interfaces with the engine exhaust gas path 14. In the illustrated embodiment of FIG. 5, an interface, generally indicated at 53, comprises the annulus 52 and a circular plate 54 coupled with the annulus 52 or made integral therewith. The plate 54 is sandwiched between two thermal insulating members 56 and 58 that isolate the plate 54 from a retaining nut 59 and the exhaust mounting boss 18. Thus, the nut 59 secures the interface 53 and thus the injector 12 to the boss 18. This mounting arrangement eliminates the need for the bracket 16 and stack-up tolerance compensating structure 32.

Figure 6:
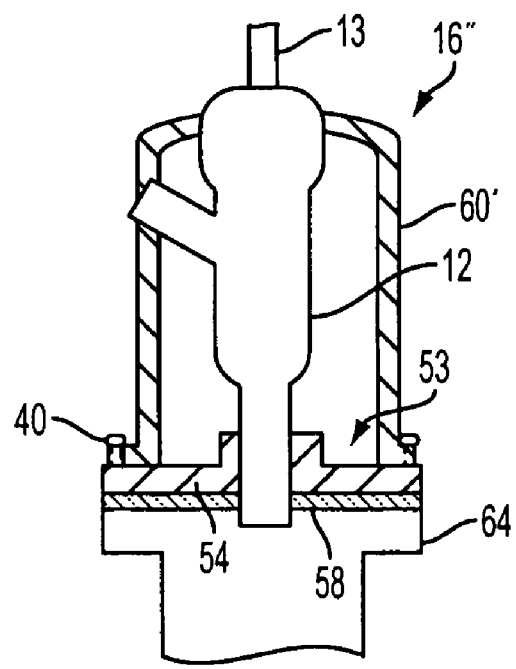
FIG. 6 is view of a heat shield in accordance with another embodiment of the invention.

In some cases, a combination of the two thermal protection functions (protection from gas (FIG. 5) and ambient temperatures (FIG. 4)) may be required. With reference to FIG. 6, the bracket 16" with heat shield 60' is coupled with the plate 54 of the interface 53 for simultaneous mounting to a flange 64 provided on the exhaust system. Mounting can be accomplished by clamping or through bolts 40 as required.

Figure 7:
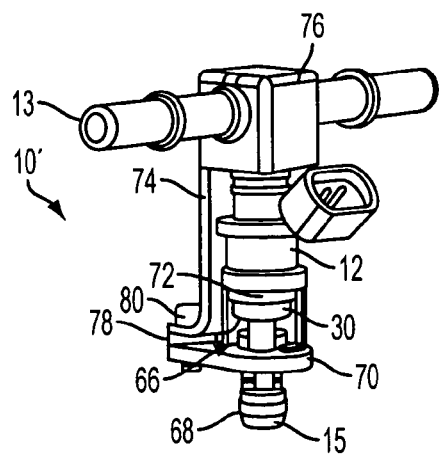
FIG. 7 is a view of a RDU provided in accordance with another embodiment of the invention.

With reference to FIG. 7, another embodiment of an RDU is shown generally indicated at 10'. The RDU 10' includes an interface, generally indicated at 66 that holds the injector 12 and provides sealing with the exhaust. In this embodiment, a high temperature radial sealing element 68 is provided of the type commonly used on gasoline direct injection systems. The sealing element 68 provides a seal within the boss 18 (see FIG. 1). The interface 66 also limits the transfer of exhaust heat outward and towards the injector body 30 by eliminating and reducing the metallic heat conduction paths, thus thermally decoupling the body of the injector 12 component from the exhaust temperatures. In the embodiment, the interface 66 includes a base 70 welded to the body 30 of the injector 12, and a generally cylindrical member 72 coupled to and extending from the base 70. The base 70 is constructed and arranged to be coupled with the exhaust pipe 21 (see FIG. 3) and the cylindrical member 72 provides support to the injector 12. If water cooling of the injector 12 is desired, the cylindrical member 72 can be made solid (e.g., cup shaped) and appropriate sealing can be employed. It is noted that FIG. 7 shows a return flow system.

The RDU 10' also includes rigid coupling between the upper fluid connection and the interface 66. More particularly, a bracket 74 is provided between the injector cup 76 and the base 70. This coupling ensures that differential vibration modes will not be transmitted through the injector body 30 resulting in damage to the injector 12. Preferably a temperature insulating member 78 is provided between the bracket 74 and the base 70 to reduce the transfer of heat to the bracket and thus cup 76. A bolt 40 couples the bracket 74 to the base 70 with the insulating member 78 there-between. The bolt 40 can also be used to secure the base 70 to the exhaust pipe 21.

Figure 8:
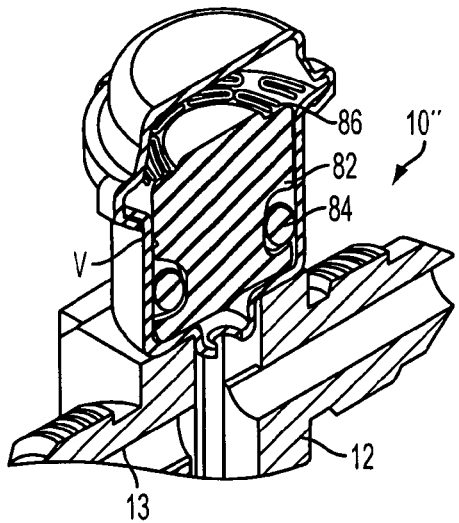
FIG. 8 is a sectional view of thermal compensation structure provided in a fluid injector of a RDU in accordance with an embodiment of the invention.

A problematic property of AUS-32 is its relatively high freezing point of −11 C. The frozen fluid expands and can cause rupture of components where compensation of this expansion is not provided. With reference to FIG. 8, a thermal compensation assembly is shown in the upper fluid connection (in communication with inlet 13) comprising a plug 82 movable in a volume V. An O-ring 84 provides radially sealing of the plug 82. The plug 82 is retained by a flat, low cost spring 86. This assembly permits movement of the plug 82 due to freezing AUS-32 to increase the fluid volume and thus protect the unit 10" from rupture and damage. Alternatively, the fluid injector 12 can be capable of heating the fluid. These injectors can comprise inductive heating or conductive heating as will be explained more fully below.

As an alternative to the conventional approach of evacuating the AUS-32 to avoid freezing thereof, in accordance with an embodiment of the invention, fluid is left in the RDU 10 as other portions of the system are purged with air. With reference to FIG. 3, upon startup, a urea solution delivery system controller 88 will recognize a state of freezing with direct temperature inputs from sensors 90 in the system itself, or from inputs received through the engine management temperature sensors. Once this freezing state is detected, the controller 88 will issue a command to the RDU 10 which actuates the injector coil 98 (FIG. 2) to deliver electrically generated heat to the RDU 10. The heat is transferred to the fluid. The fluid will melt with sufficient heat to bring the frozen fluid to its melting point and to overcome the latent heat of liquefaction.

The initial command to the RDU 10 could take the form of an unmodulated "full on" signal, or of a pulsewidth modulated signal at a predetermined duty cycle. In any case, at a predetermined point during the de-icing process, the command signal will revert to a pulsewidth modulated signal. At this point, the controller 88, equipped with diagnostic means 96 to analyze the voltage or current signal to the injector 12 (e.g., reading the injector differential voltage through an analog-to-digital converter and processing the signal with an on-board signal processor), can detect whether or not the injector armature 100 is in motion or not as a result of a change in the injector circuit inductance, or by mapping the signal onto a pre-programmed map of a baseline signal. This inductance change is brought about by changes in the magnetic circuit reluctance and flux when the armature changes position, altering the characteristics of the magnetic circuit.

Upon detection of armature motion and hence the presence of liquid in the injector 12, the controller 88 has an option to discontinue heating and to bring the armature back to a closed position, minimizing unwanted fluid delivery to the engine exhaust.

To prevent boiling of the fluid (urea solution) during high temperature events where fluid flow has been interrupted assumes a system configuration permitting variable fluid pressures. This system can be realized in a number of traditional ways. For example, as shown in FIG. 3, a pump 102 of module 94 is operated electronically and thus modulated to provide a variable flow rate in the "dead-headed" system 97 (single fluid line providing communication between the pump 102 and injector 12). Alternatively, a variable flow or fixed flow pump can be provided with an electronically modulated solenoid valve serving as a pressure regulator. The solenoid valve provides communication between the pressurized fluid line and a return line to the fluid reservoir, or to the reservoir itself. In both of these systems, pressure sensing or alternative means of deducing fluid pressure is provided (e.g., pressure sensor 104 in FIG. 3). The controller 88 can be in communication with an engine/exhaust management controller or integrated within the engine/exhaust management controller.

The boiling prevention algorithm involves recognition by the controller 88 that a diesel particulate filter regeneration event is occurring. The regeneration event is generally accompanied by a command from the controller 88 to cease urea solution injection by the injector 12. Injection ceases in order to minimize urea solution and ammonia at the reduction catalyst. At the high temperatures caused by the regeneration, these fluids can damage the catalyst.

Figure 9:
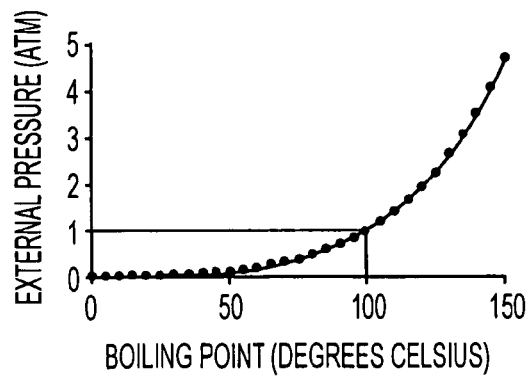
FIG. 9 is a graph illustrating the effect of pressure on boiling point in accordance with an embodiment of the invention.

Upon recognition of the regeneration event, the controller 88 issues a command to the system to substantially increase, even maximize the fluid pressure in the system. This can be accomplished via control of the variable flow pump 98, or the pressure regulator solenoid, depending on which one is employed in the fluid supply system. The fluid supply pressure can be increased well beyond the normal operating pressure of the fluid injector 12, for example to the injector's "proof" pressure. The higher fluid pressure increases the boiling point of the fluid. An illustration of this effect on the boiling point of water (analogous to AUS-32) is shown in FIG. 9. Thus, it can be appreciated that by controlling pressure of the fluid, boiling can be prevented. The fluid pressure is then returned to normal operating pressures after the regeneration event is terminated, and normal fluid injection is required.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for selective catalytic reduction (SCR) after-treatment for vehicles, the reductant delivery unit comprising:
    a solenoid fluid injector constructed and arranged to be associated with an exhaust gas flow path upstream of a SCR catalytic converter, the fluid injector having a fluid inlet and a fluid outlet and a coil, the fluid inlet being constructed and arranged to receive a source of urea solution and the fluid outlet being constructed and arranged to communicate directly with the exhaust flow path so as to control injection of urea solution into the exhaust gas flow path,
    an interface constructed and arranged to couple the fluid injector to the gas flow path, the interface defining a thermal barrier constructed and arranged to decoupled a body of the injector from exposure to heat in the exhaust gas flow path, and
    a controller constructed and arranged to determine whether urea solution in the injector is frozen and if the urea solution is determined to be frozen, the controller is constructed and arranged to actuate the coil thereby delivering electrically generated heat to the fluid injector to melt the urea solution.

2. The unit of claim 1, further comprising a bracket constructed and arranged to mount the unit to a portion of an exhaust pipe of the exhaust gas flow path.

3. The unit of claim 2, wherein the thermal barrier is defined by a gasket constructed and arranged to seal exhaust gas in the exhaust gas flow path and a non-metallic guide constructed and arranged to support an end of the injector with respect to a boss of the exhaust pipe.

4. The unit of claim 2, wherein the bracket includes a main body and a plurality of legs extending from the main body, the legs being constructed and arranged to be coupled to the exhaust pipe.

5. The unit of claim 2, further comprising stack-up compensating structure between the bracket and the body of the injector constructed and arranged to compensate for stack-up tolerances when the injector is mounted with respect to the exhaust pipe.

6. The unit of claim 5, wherein the compensating structure comprises a plurality of compliant members.

7. The unit of claim 6, wherein the compliant members include a plurality of stacked wave washers.

8. The unit of claim 4, further comprising stack-up compensating structure between the main body of the bracket and the body of the injector constructed and arranged to compensate for stack-up tolerances when the injector is mounted with respect to the exhaust pipe.

9. The unit of claim 8, wherein the compensating structure comprises a plurality of compliant members.

10. The unit of claim 9, wherein the compliant members are wave washers.

11. The unit of claim 1, further comprising a diverter coupled with the fluid outlet of the injector, the diverter being constructed and arranged to divert a flow of urea solution away from surfaces defining the exhaust path.

12. The unit of claim 1, wherein the interface comprises an annulus welded to the body of injector and a plate coupled with the annulus.

13. The unit of claim 12, wherein a boss is associated with the gas flow path, the unit further comprising a retaining nut constructed and arranged to be threadedly engaged with the boss such that the plate is sandwiched between two thermally insulating members that isolate the plate from the retaining nut and the boss.

14. The unit of claim 1, further comprising a heat shield substantially surrounding the unit, the heat shield being of generally bell-shape and constructed and arranged to shield the unit from ambient temperature.

15. The unit of claim 2, wherein the bracket is of generally bell-shape having a bell end coupled with the injector and a lip, opposite the bell end, constructed and arranged to be coupled with the exhaust pipe.

16. The unit of claim 1, wherein the interface comprises a base welded to the body of the injector and a generally cylindrical member coupled to and extending from the base, the cylindrical member supporting a portion of the injector and the base being constructed and arranged to be coupled with a member that defines a portion of the exhaust gas flow path.

17. The unit of claim 16, wherein the injector includes an injector cup, and wherein a bracket is provided between the injector cup and the base to provide support to the cup.

18. The unit of claim 17, further including an insulating element between the bracket and the base to reduce transfer of heat to the bracket.

19. The unit of claim 1, further comprising a thermal compensation assembly in communication with the inlet and constructed and arranged to accommodate expansion of the urea solution upon freezing thereof.

20. The unit of claim 19, wherein the assembly includes a plug movable within a volume to accommodate the expansion of the urea solution, a seal member to provide radially sealing of the plug and a spring to retain the plug.

21. The unit of claim 1, in combination with an exhaust pipe defining a portion of the gas flow path, the interface being disposed between the exhaust pipe and the fluid injector.

22. The unit of claim 1, in combination with a pump to define a system with the controller, the pump being constructed and arranged to deliver the urea solution to the injector, the controller being constructed and arranged to control the pump to increase pressure of the urea solution in the system so as to prevent boiling of the urea solution.

23. A reductant delivery system for selective catalytic reduction (SCR) after-treatment for vehicles, the reductant delivery system comprising:
an exhaust pipe defining a portion of an exhaust gas flow path upstream of a SCR catalytic converter,
a solenoid fluid injector associated with the exhaust pipe, the fluid injector having a fluid inlet and a fluid outlet, the fluid inlet being constructed and arranged to receive a source of urea solution and the fluid outlet communicating directly with the exhaust flow path so as to control injection of urea solution into the exhaust flow path, and
an interface between the exhaust pipe and the injector, the interface including a gasket constructed and arranged to seal exhaust gas in the exhaust pipe, and a non-metallic guide constructed and arranged to support an end of the injector with respect to a boss of the exhaust pipe, the gasket and guide defining a thermal barrier constructed and arranged to decoupled a body of the injector from exposure to heat in the exhaust gas flow path.

24. The assembly of claim 23, wherein the guide is made of polytetrafluoroethylene.

25. The assembly of claim 24, further comprising a bracket constructed and arranged to mount the assembly to a portion of the exhaust pipe.

26. The assembly of claim 25, wherein the bracket includes a main body and a plurality of legs extending from the main body, the legs being constructed and arranged to be coupled to the exhaust pipe.

27. A method of heating urea solution in a reductant delivery system for selective catalytic reduction (SCR) after-treatment for vehicles, the system including a fluid injector, having a coil and armature, mounted with respect to an exhaust gas flow path so as to inject urea solution directly into the exhaust gas flow path, and a controller operatively associated with the fluid injector to control operation of the fluid injector, the method comprising:
determining whether urea solution has frozen within the fluid injector, and
issuing a command, via the controller, to the fluid injector to actuate the coil thereby delivering electrically generated heat to the fluid injector to melt the urea solution.

28. The method of claim 27, wherein the step of determining whether urea solution has frozen includes monitoring a temperature of the system.

29. The method of claim 27, wherein the step of issuing the command provides one of an unmodulated full on signal or a pulse width modulated signal at a predetermined duty cycle.

30. The method of claim 27, further comprising:
determining whether liquid urea solution is present in the injector by determining whether armature is moving, and
if the armature is moving, discontinuing actuation of the coil.

31. The method of claim 30, wherein the step of determining whether the armature is moving includes detecting a change in inductance in a circuit of the injector.

32. A method of preventing boiling of urea solution in a reductant delivery system for selective catalytic reduction (SCR) after-treatment for vehicles, the system including a fluid injector mounted with respect to an exhaust gas flow path so as to inject urea solution directly into the exhaust gas flow path, a controller operatively associated with the fluid injector to control operation of the fluid injector and a pump, operatively associated with the controller, for delivering urea solution to the fluid injector, the method comprising:

delivering urea solution to the fluid injector via the pump, determining whether a diesel particulate regeneration event is occurring, and if the event is occurring, ceasing delivery of the urea solution to the fluid injector and controlling the pump to increase pressure of the urea solution in the system above a normal operating pressure to prevent boiling of the urea solution.

33. The method of claim 32, wherein the pump provides a variable flow rate of urea solution.

\* \* \* \* \*